US009149405B2

(12) United States Patent
Braun

(10) Patent No.: US 9,149,405 B2
(45) Date of Patent: Oct. 6, 2015

(54) MEDICATION STORAGE AND DISPENSING UNIT HAVING A VIAL DISPENSER

(75) Inventor: Patrick Joseph Braun, Pittsburgh, PA (US)

(73) Assignee: Aesynt Incorporated, Cranberry, PA (US)

( * ) Notice: Subject to any disclaimer, the term of this patent is extended or adjusted under 35 U.S.C. 154(b) by 782 days.

(21) Appl. No.: 12/397,078

(22) Filed: Mar. 3, 2009

(65) Prior Publication Data

US 2010/0228392 A1 Sep. 9, 2010

(51) Int. Cl.
*B65D 83/04* (2006.01)
*G06F 17/00* (2006.01)
*A61G 12/00* (2006.01)
*G07F 11/00* (2006.01)
*G07F 11/10* (2006.01)
*G07F 17/00* (2006.01)

(52) U.S. Cl.
CPC ............ *A61G 12/001* (2013.01); *G07F 11/007* (2013.01); *G07F 11/10* (2013.01); *G07F 17/0092* (2013.01)

(58) Field of Classification Search
CPC .................................................... G07F 11/007
USPC ....... 221/298, 7–8, 12, 282–284, 286, 312 R, 221/124, 131, 154; 700/232, 242, 243, 236
See application file for complete search history.

(56) References Cited

U.S. PATENT DOCUMENTS 2,272,682 A * 2/1942 Srodulski ........................ 312/42
2,704,144 A * 3/1955 Rety et al. ........................ 193/38
3,145,066 A * 8/1964 O'Neal ........................... 312/45
3,757,998 A * 9/1973 Millies et al. ................. 221/242
3,883,038 A * 5/1975 Bookout ......................... 221/67
3,924,779 A * 12/1975 Lindsey .......................... 221/67
4,119,243 A * 10/1978 Marecek et al. .............. 221/298
4,220,235 A * 9/1980 Lindsey et al. ............... 194/240
4,232,800 A * 11/1980 Martin et al. ................. 221/109
4,409,773 A * 10/1983 Bergman et al. .................. 52/54
4,460,107 A * 7/1984 Lindsey .......................... 221/67
4,511,060 A * 4/1985 Lindsey ........................ 221/115
4,693,357 A * 9/1987 Aschenbeck et al. ......... 194/202
4,717,042 A 1/1988 McLaughlin
4,785,969 A 11/1988 McLaughlin
4,795,018 A * 1/1989 Anderson ..................... 193/2 C
4,847,764 A 7/1989 Halvorson
4,860,922 A * 8/1989 Malservisi et al. ............... 221/6
4,881,787 A * 11/1989 King et al. ...................... 312/42
4,896,792 A * 1/1990 Marchand ....................... 221/11
5,014,875 A 5/1991 McLaughlin et al.
5,117,749 A * 6/1992 Bakker ........................ 99/450.1
5,190,185 A 3/1993 Blechl
5,314,243 A 5/1994 McDonald et al.

(Continued)

*Primary Examiner* — Michael K Collins
(74) *Attorney, Agent, or Firm* — Alston & Bird LLP

(57) ABSTRACT

A medication storage and dispensing unit is provided which includes a support platform and a vial dispenser supported by the support platform. The vial dispenser may include a chute configured to store a plurality of vials of medication and a gate configured to be alternately positioned in a closed position in which the vials remain within the chute and an open position in which a vial is dispensed from the chute. The medication storage and dispensing unit may be computer controlled so as to include a computing device configured to receive user input regarding dispensation of a vial. The computing device may be further configured to actuate the gate to thereby permit the gate to move to the open position such that the vial is dispensed from the chute.

25 Claims, 4 Drawing Sheets

(56) References Cited

U.S. PATENT DOCUMENTS

| | | | | |
|---|---|---|---|---|
| 5,346,297 | A | 9/1994 | Colson, Jr. et al. | |
| 5,377,864 | A | 1/1995 | Blechl et al. | |
| 5,405,048 | A | 4/1995 | Rogers et al. | |
| 5,431,299 | A | 7/1995 | Brewer et al. | |
| 5,460,294 | A | 10/1995 | Williams | |
| 5,468,110 | A | 11/1995 | McDonald et al. | |
| 5,480,062 | A | 1/1996 | Rogers et al. | |
| 5,520,450 | A | 5/1996 | Colson, Jr. et al. | |
| 5,564,803 | A | 10/1996 | McDonald et al. | |
| 5,593,267 | A | 1/1997 | McDonald et al. | |
| 5,597,995 | A * | 1/1997 | Williams et al. | 235/375 |
| 5,661,978 | A | 9/1997 | Holmes et al. | |
| D384,578 | S | 10/1997 | Wangu et al. | |
| 5,713,485 | A | 2/1998 | Liff et al. | |
| 5,716,114 | A | 2/1998 | Holmes et al. | |
| 5,745,366 | A | 4/1998 | Higham et al. | |
| 5,761,877 | A | 6/1998 | Quandt | |
| 5,797,515 | A | 8/1998 | Liff et al. | |
| 5,799,823 | A * | 9/1998 | Feltrin | 221/298 |
| 5,805,456 | A | 9/1998 | Higham et al. | |
| 5,842,976 | A | 12/1998 | Williamson | |
| 5,878,885 | A | 3/1999 | Wangu et al. | |
| 5,880,443 | A | 3/1999 | McDonald et al. | |
| 5,883,806 | A | 3/1999 | Meador et al. | |
| 5,893,697 | A | 4/1999 | Zini et al. | |
| 5,905,653 | A | 5/1999 | Higham et al. | |
| 5,912,818 | A | 6/1999 | McGrady et al. | |
| 5,927,540 | A | 7/1999 | Godlewski | |
| 5,940,306 | A | 8/1999 | Gardner et al. | |
| 5,967,364 | A * | 10/1999 | Swanson et al. | 221/6 |
| 5,971,593 | A | 10/1999 | McGrady | |
| 6,003,006 | A | 12/1999 | Colella et al. | |
| 6,011,999 | A | 1/2000 | Holmes | |
| 6,012,604 | A * | 1/2000 | Takahashi et al. | 221/242 |
| 6,021,392 | A | 2/2000 | Lester et al. | |
| 6,039,467 | A | 3/2000 | Holmes | |
| 6,065,819 | A | 5/2000 | Holmes et al. | |
| 6,068,156 | A | 5/2000 | Liff et al. | |
| 6,109,774 | A | 8/2000 | Holmes et al. | |
| 6,112,502 | A | 9/2000 | Frederick et al. | |
| 6,116,461 | A | 9/2000 | Broadfield et al. | |
| 6,151,536 | A | 11/2000 | Arnold et al. | |
| 6,168,047 | B1 * | 1/2001 | Takamura et al. | 221/303 |
| 6,170,230 | B1 | 1/2001 | Chudy et al. | |
| 6,176,392 | B1 | 1/2001 | William et al. | |
| 6,189,727 | B1 | 2/2001 | Shoenfeld | |
| 6,223,934 | B1 | 5/2001 | Shoenfeld | |
| 6,256,967 | B1 | 7/2001 | Hebron et al. | |
| 6,283,322 | B1 | 9/2001 | Liff et al. | |
| 6,289,656 | B1 | 9/2001 | Wangu et al. | |
| 6,302,293 | B1 * | 10/2001 | Wittern et al. | 221/92 |
| 6,308,494 | B1 * | 10/2001 | Yuyama et al. | 53/131.3 |
| 6,338,007 | B1 | 1/2002 | Broadfield et al. | |
| 6,339,732 | B1 | 1/2002 | Phoon et al. | |
| 6,361,263 | B1 | 3/2002 | Dewey et al. | |
| 6,370,841 | B1 | 4/2002 | Chudy et al. | |
| 6,449,927 | B2 | 9/2002 | Hebron et al. | |
| 6,471,089 | B2 | 10/2002 | Liff et al. | |
| 6,497,342 | B2 | 12/2002 | Zhang et al. | |
| 6,499,270 | B2 | 12/2002 | Peroni et al. | |
| 6,532,399 | B2 | 3/2003 | Mase | |
| 6,564,121 | B1 | 5/2003 | Wallace et al. | |
| 6,581,798 | B2 | 6/2003 | Liff et al. | |
| 6,609,047 | B1 | 8/2003 | Lipps | |
| 6,611,733 | B1 | 8/2003 | De La Huerga | |
| 6,625,952 | B1 | 9/2003 | Chudy et al. | |
| 6,640,159 | B2 | 10/2003 | Holmes et al. | |
| 6,650,964 | B2 | 11/2003 | Spano, Jr. et al. | |
| 6,671,579 | B2 | 12/2003 | Spano, Jr. et al. | |
| 6,681,149 | B2 | 1/2004 | William et al. | |
| 6,742,671 | B2 | 6/2004 | Hebron et al. | |
| 6,755,931 | B2 | 6/2004 | Vollm et al. | |
| 6,760,643 | B2 | 7/2004 | Lipps | |
| 6,776,304 | B2 | 8/2004 | Liff et al. | |
| 6,785,589 | B2 | 8/2004 | Eggenberger et al. | |
| 6,790,198 | B1 | 9/2004 | White et al. | |
| 6,814,254 | B2 | 11/2004 | Liff et al. | |
| 6,814,255 | B2 | 11/2004 | Liff et al. | |
| 6,847,861 | B2 | 1/2005 | Lunak et al. | |
| 6,874,684 | B1 | 4/2005 | Denenberg et al. | |
| 6,892,780 | B2 | 5/2005 | Vollm et al. | |
| 6,895,304 | B2 | 5/2005 | Spano, Jr. et al. | |
| 6,975,922 | B2 | 12/2005 | Duncan et al. | |
| 6,985,797 | B2 | 1/2006 | Spano, Jr. et al. | |
| 6,996,455 | B2 | 2/2006 | Eggenberger et al. | |
| 7,010,389 | B2 | 3/2006 | Lunak et al. | |
| 7,014,063 | B2 | 3/2006 | Shows et al. | |
| 7,016,766 | B2 | 3/2006 | William et al. | |
| 7,040,504 | B2 | 5/2006 | Broadfield et al. | |
| 7,052,097 | B2 | 5/2006 | Meek, Jr. et al. | |
| 7,066,804 | B2 * | 6/2006 | Sawhill et al. | 452/34 |
| 7,072,737 | B2 | 7/2006 | Lunak et al. | |
| 7,072,855 | B1 | 7/2006 | Godlewski et al. | |
| 7,077,286 | B2 | 7/2006 | Shows et al. | |
| 7,085,621 | B2 | 8/2006 | Spano, Jr. et al. | |
| 7,092,796 | B2 | 8/2006 | Vanderveen | |
| 7,093,755 | B2 | 8/2006 | Jordan et al. | |
| 7,100,792 | B2 | 9/2006 | Hunter et al. | |
| 7,103,419 | B2 | 9/2006 | Engleson et al. | |
| 7,111,780 | B2 | 9/2006 | Broussard et al. | |
| 7,139,639 | B2 | 11/2006 | Broussard et al. | |
| 7,150,724 | B2 | 12/2006 | Morris et al. | |
| 7,171,277 | B2 | 1/2007 | Engleson et al. | |
| 7,218,231 | B2 | 5/2007 | Higham | |
| 7,228,198 | B2 | 6/2007 | Vollm et al. | |
| 7,246,719 | B2 * | 7/2007 | Mason et al. | 221/241 |
| 7,249,688 | B2 | 7/2007 | Hunter et al. | |
| 7,348,884 | B2 | 3/2008 | Higham | |
| 7,401,710 | B2 * | 7/2008 | Black et al. | 221/131 |
| 7,404,501 | B2 * | 7/2008 | Kelly | 221/241 |
| 7,417,729 | B2 | 8/2008 | Greenwald | |
| 7,419,133 | B2 | 9/2008 | Clarke et al. | |
| 7,426,425 | B2 | 9/2008 | Meek, Jr. et al. | |
| 7,554,449 | B2 | 6/2009 | Higham | |
| 7,571,024 | B2 | 8/2009 | Duncan et al. | |
| 7,588,167 | B2 | 9/2009 | Hunter et al. | |
| 7,753,229 | B2 * | 7/2010 | Hutchinson et al. | 221/7 |
| 7,831,334 | B2 * | 11/2010 | Vollm et al. | 700/231 |
| 7,988,015 | B2 * | 8/2011 | Mason et al. | 221/241 |
| 2002/0154987 | A1 * | 10/2002 | Yuyama et al. | 414/798.1 |
| 2003/0121929 | A1 * | 7/2003 | Liff et al. | 221/7 |
| 2005/0145644 | A1 * | 7/2005 | Mori et al. | 221/242 |
| 2007/0169437 | A1 * | 7/2007 | Yuyama et al. | 53/467 |

* cited by examiner

MEDICATION STORAGE AND DISPENSING UNIT HAVING A VIAL DISPENSER

FIELD OF THE INVENTION

Embodiments of the present invention relate generally to medication storage and dispensing units and more particularly, to medication storage and dispensing units configured to efficiently and controllably dispense vials of medication.

BACKGROUND OF THE INVENTION

Medication carts are utilized for various purposes throughout a healthcare facility and elsewhere. For example, medication carts storing a plurality of different medications may be deployed to the various floors or other units of a hospital or healthcare facility in order to provide a secure repository for the medications prescribed for the patients on the floor or other unit. One type of medication cart is an anesthesia cart utilized by anesthesiologists in the operating room and elsewhere. An anesthesia cart stores the various medications employed by an anesthesiologist as well as the other items used for dispensing those medications, such as syringes, gloves, etc.

A medication cart, such as an anesthesia cart, generally includes a plurality of drawers with each drawer having a plurality of compartments for storing different medications. Each drawer is generally locked and within certain drawers, there are compartments that have a lid or a plurality of lids which are also locked. As such, access to the various medications may be controlled. Although the drawers and the individual compartments may be locked by means of a key lock or other mechanical locking mechanism, anesthesia carts have been developed in which the locking mechanism of the drawers and the individual compartments are controlled by a computer. As such, an anesthesiologist or other user of a computer controlled anesthesia cart would log into the computer and provide information, such as user name and password, from which the anesthesiologist or other user could be identified as an authorized user. In one configuration, the user could then select a particular medication and the computer would direct the anesthesia cart to unlock the drawer and the respective compartment within which the selected medication is stored. In another configuration that provides somewhat increased control over the dispensation of the medications, the user could identify a patient, select a prescription or other order associated with the patient and request access to one of the medications prescribed or ordered for the patient with the computer then instructing the anesthesia cart to unlock the drawer and the respective compartment within which the respective medication is stored, if the user is authorized to access the anesthesia cart and the patient has been prescribed or otherwise ordered the medication selected by the user.

While anesthesia or other medication carts may provide control over the medications stored therein by requiring an authorization and access control process, such as described above, to be individually repeated for each medication stored by the anesthesia cart for which access is desired, the authorization and access control process may be undesirably time-consuming. For example, in instances in which an anesthesiologist or other user desires to withdraw multiple medications from the anesthesia cart, the authorization and access control process must be repeated for each medication which may require the anesthesiologist or other user to expend a meaningful amount of time simply opening and closing multiple drawers and, in turn, the multiple compartments that store the requested medication. As such, it would be desirable to provide an improved medication cart for securely controlling access to the medications stored therein, while permitting the medications to be accessed in a more efficient and timely manner.

The contents of the medication cart must frequently be inventoried in order to determine the type and quantities of medication remaining in the medication cart. For example, an inventory of a medication cart may need to be conducted each day. In order to conduct an inventory of a medication cart, each drawer and, in turn, each compartment within a drawer must be individually accessed and the contents of each compartment must be counted. As described above, the individual access to each compartment within a medication cart may take a significant amount of time since each compartment must be individually unlocked and opened and the contents therewithin must be counted. In addition, since the compartments generally hold the drugs in a random grouping and the drugs within the compartments can be stacked one on top of the other, the individual drug containers sometimes need to be removed from the compartments so as to obtain an accurate count. As such, it would be desirable to provide an improved medication cart for permitting the remaining inventory stored within a medication cart to be determined in an efficient manner.

Although medication carts, such as anesthesia carts, generally control the access to the individual compartment, a user may withdraw multiple vials from an individual compartment once the user has been granted access to the compartment. For example, if an anesthesiologist knows that he will need to administer the same medication to both the current patient and the next patient, the anesthesiologist may withdraw two vials of the particular medication from the respective compartment even though he has only been granted access to the compartment for the purposes of withdrawing the medication needed for the current patient so as to avoid having to access the same compartment on two occasions. This practice circumvents, however, the control otherwise provided by a medication cart with respect to the medication stored therein. As such, unit dose dispensers have been developed that limit access to one vial or medication, but unit dose dispensers are generally built within a drawer that must first be opened in order to retrieve the medication. As such, it would be desirable to provide an improved medication cart for providing controlled access to the medications stored therein, but which permitted authorized access in an efficient manner so as to reduce the likelihood of users being tempted to circumvent the control otherwise provided by a medication cart by withdrawing multiple vials of a medication.

BRIEF SUMMARY OF THE INVENTION

A medication storage and dispensing unit as well as an associated vial dispenser are provided according to embodiments of the present invention. As described below, the medication storage and dispensing unit as well as the vial dispenser of embodiments of the present invention provide control over the medications stored therein, but provide for more efficient access to the medications such that anesthesiologists and other users are required to expend less time accessing the necessary medications. Additionally, the medication storage and dispensing unit and the associated vial dispenser of embodiments of the present invention may facilitate the inventory process by permitting the vials of medication that remain within the vial dispenser to be counted in an efficient manner. Additionally, the medication storage and dispensing unit and the associated vial dispenser of embodiments of the present invention may limit access to a single vial of medication, thereby reducing or eliminating the possibility that more vials will be removed from the medication storage and dispensing unit than those for which authorization and access has been granted.

A medication storage and dispensing unit is provided according to one embodiment which includes a support platform, such as a medication storage cabinet, and a vial dispenser supported by the support platform. The vial dispenser may include a chute, such as an upwardly extending chute, configured to store a plurality of vials of medication and a gate configured to be alternately positioned in a closed position in which the vials remain within the chute and an open position in which a vial is dispensed, such as by gravity feed, from the chute. In one embodiment, the medication storage and dispensing unit is computer controlled so as to include a computing device configured to receive user input regarding dispensation of a vial. The computing device of this embodiment is further configured to actuate the gate to thereby permit the gate to move to the open position such that the vial is dispensed from the chute. In one embodiment, the vial dispenser is configured or otherwise controlled so as to dispense a single vial at a time.

In one embodiment, the vial dispenser includes a plurality of upwardly extending chutes with each chute being configured to store a plurality of vials of a respective medication. Within a chute, the plurality of vials of medication may be stacked one upon another. In this regard, the vials of a medication may have a predefined diameter. Thus, an upwardly extending chute may be sized to store the plurality of vials of medication stacked diameter on diameter. A chute may include a pair of opposed walls defining a width therebetween. The width of the chute may be adjustable, such as to approximate the size, e.g., the diameter, of the vials stored within the chute. A vial dispenser according to one embodiment may also include a quantity indicator associated with the chute and configured to indicate a quantity of vials within the chute.

In one embodiment, a vial dispenser is provided that includes a housing and a plurality of upwardly extending, individually accessible drawers disposed within the housing. Each drawer is configured for moving inward and outward in a first direction relative to the housing. Additionally, each drawer may include a chute configured to store a plurality of vials of medication stacked one upon another. In one embodiment, at least one drawer includes a plurality of upwardly extending chutes with each chute configured to store a plurality of vials of a respective medication. Each chute of this embodiment extends upwardly in a second direction that is different than the first direction. Each drawer may also include a gate configured to be alternately and controllably positioned in a closed position in which vials remain within the chute and an open position in which a vial is dispensed, such as by gravity feed, from the chute. In embodiment, the vial dispenser having the plurality of upwardly extending, individual accessible drawers may be mounted upon a support platform, such as a medication storage cabinet having at least one drawer of its own.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
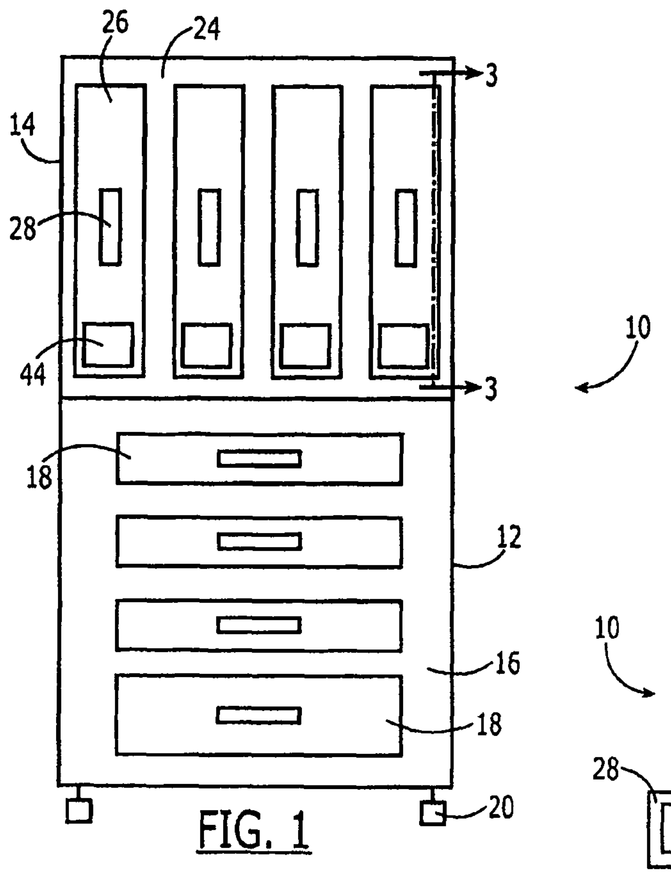
FIG. 1 is a front view of a medication storage and dispensing unit in accordance with one embodiment to the present invention.

Referring now to FIG. 1, a medication storage and dispensing unit 10 according to one embodiment of the present invention is depicted. The medication storage and dispensing unit of the illustrated embodiment includes a support platform, such as a medication storage cabinet 12, and a vial dispenser 14 extending upwardly from the support platform. Although a variety of support platforms may be employed, the support platform of one embodiment comprises a medication storage cabinet that generally includes a housing 16 and at least one and, more typically, a plurality of drawers 18 configured to slide inward and outward, such as in a generally horizontal plane, relative to the housing. Each drawer may include a plurality of compartments. In the illustrated embodiment, each drawer extends in a generally horizontal direction such that the compartments would open upwardly. In one embodiment, each drawer is individually locked and, within each drawer, at least one and, in some embodiments, all of the compartments include a lid that is individually locked and must be opened in order to access the medication or other items within the compartment. Although the drawers and the compartments within the drawers of the medication storage cabinet may be locked with respective key locks or other mechanical locking mechanisms that are mechanically locked and unlocked, such as by means of a key, the drawers and the compartments within the drawers of the medication storage cabinet may be locked by locking mechanisms that are actuated, e.g., unlocked and locked, by a computing device, as discussed below.

Figure 2:
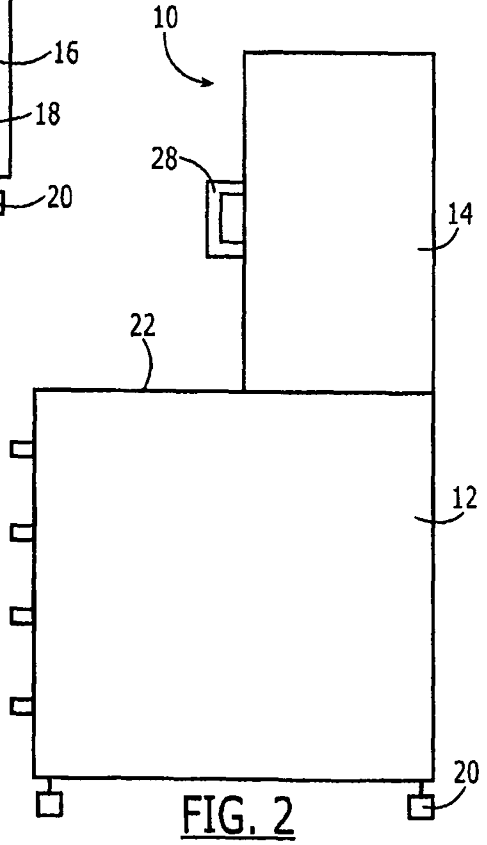
FIG. 2 is a side view of the medication storage and dispensing unit of FIG. 1.

As shown in FIGS. 1 and 2, the support platform, such as the medication storage cabinet 12, may include wheels 20, rollers, casters or the like for facilitating the movement of the medication storage and dispensing unit 10. However, the support platform need not include rollers, wheels, casters or the like if the mobility of the medication storage and dispensing unit is not necessary.

As shown in FIG. 2, the support platform, such as the medication storage cabinet 12, may include an upper work surface 22. For example, the upper work surface may be a generally horizontal surface. The vial dispenser 14 of one embodiment is seated upon or otherwise supported by the upper work surface and is attached to or otherwise integrated with the support platform in order to permit at least a portion of the upper work surface to be accessible to a user. For example, the vial dispenser may be positioned proximate a rear edge of the support platform, such as the medication storage cabinet, such that the forwardmost portion of the upper work surface remains available for use. By mounting the vial dispenser upon the support platform, such as the medication storage cabinet, the footprint of medication storage and dispensing unit 10 need be no larger than the footprint of the support platform even though the medication storage and dispensing unit offers enhanced functionality. Since the medication storage and dispensing unit may be employed in settings, such as the operating room, in which space is limited, the capability of providing the additional functionality of the medication storage and dispensing unit of embodiments of the present invention without increasing the footprint of the support platform may be advantageous.

The vial dispenser 14 can include a housing 24 and a plurality of upwardly extending, individually accessible drawers 26. As shown in FIG. 1, the upwardly extending drawers of the vial dispenser may be positioned orthogonal with respect to the drawers of the medication storage cabinet 12. As used herein, an upward direction includes any direction that includes an upward component including a vertical direction and any inclined direction having both horizontal and vertical components. Moreover, while the drawers of the vial dispenser that are illustrated and will be described herein are positioned to be upwardly extending and orthogonal to the drawers of the medication storage cabinet, the drawers of the vial dispenser need not be orthogonal to the drawers of the medication storage cabinet and, instead, the drawers could be positioned in some other configuration, such as by having the drawers of both the vial dispenser and the medication storage cabinet open parallel, that is, in the same direction, to one another. In one embodiment in which the drawers of the vial dispenser and the drawers of the medication storage cabinet are positioned parallel to one another and in a horizontal arrangement, the drawers of the vial dispenser may include an inclined floor to as to provide for gravity feed of the vials or a spring loaded pusher plate to apply force to the vials to encourage the vials toward the front of the respective drawer.

Each drawer 26 of the vial dispenser 14 may be configured to move inward and outward in a first direction relative to the housing 24. In this regard, each drawer can include a handle 28 that a user may grasp in order to slide the respective drawer outward or inward relative to the housing. As described below, each of the drawers may be individually locked such that access to the contents of the drawers is controlled. While each drawer may be locked by means of a key lock or other locking mechanism that is actuated by means of a key or mechanical mechanism, the locking mechanism associated with each drawer may be actuated, e.g., unlocked and locked, by a computing device that is configured to control access to the drawers and their respective contents, as described below.

Figure 3:
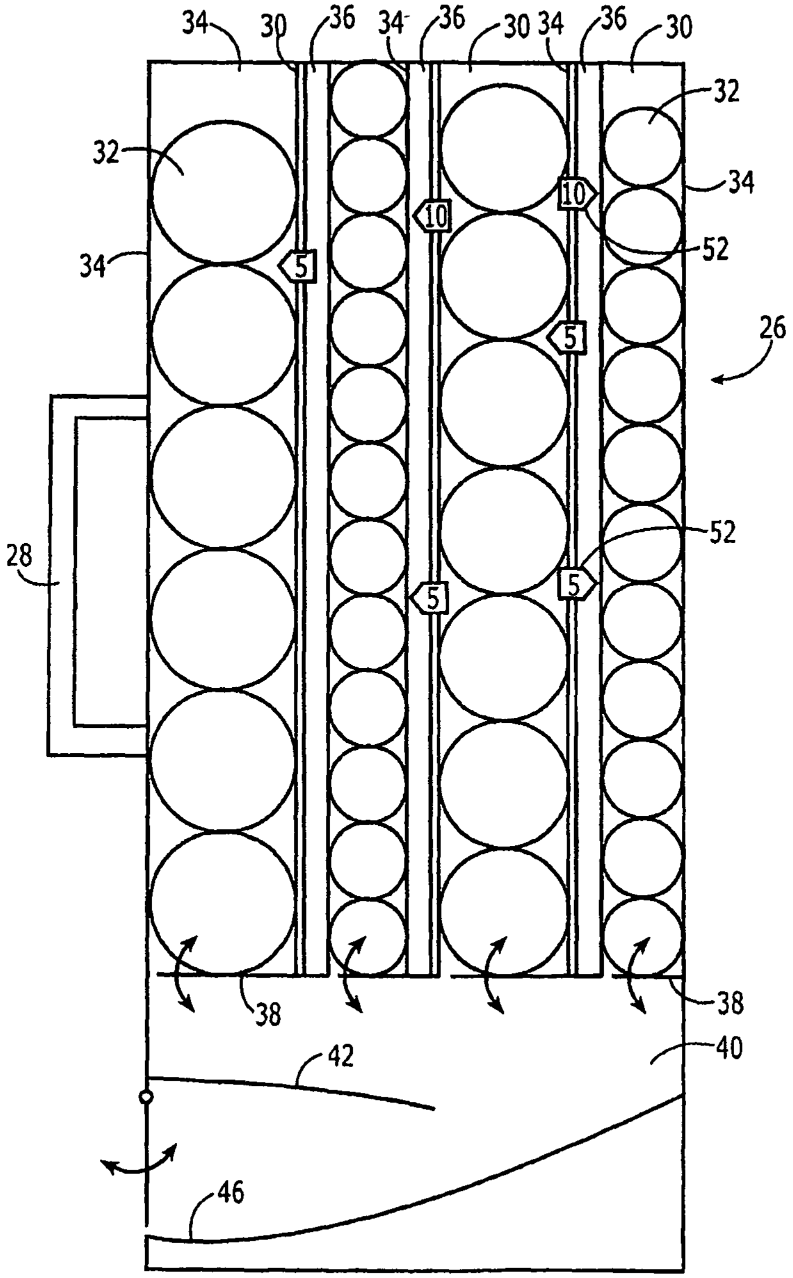
FIG. 3 is a cross section of a drawer of the vial dispenser of the medication storage and dispensing unit of FIG. 1 taken along line 3-3 of FIG. 1.

As shown in cross-section in FIG. 3, each drawer 26 may include at least one and, in some embodiments, a plurality of chutes, such as upwardly extending chutes 30. In the illustrated embodiment, each chute defines a vertically extending passageway, but in other embodiments the upwardly extending chutes may extend upwardly at an angle with respect to a vertical axis and/or in various non-linear configurations, if so desired. Each chute may be configured to store a plurality of vials 32 of medications which may be stacked one upon another. In this regard, the vials of medication stacked within a respective chute may be the same size and shape and may contain the same quantity of the same medication. In the illustrated embodiment, for example, the vials are cylindrical with each vial defining a respective diameter. As such, the vials may be stacked diameter upon diameter within the chutes of an upwardly extending drawer, as shown in FIG. 3.

In one embodiment, the chutes 30 may be configured to store differently sized vials 32. As shown in FIG. 3, for example, one chute may be configured to store relatively small vials, while two other chutes are configured to store relatively large vials and yet another chute is configured to store vials having an intermediate size. In order to facilitate the stacking of the vials one upon another, the chutes may be configured to have a width as defined by the pair of opposed walls 34 that define the chute that approximates the diameter of the vials to be stored therein, such as by being only slightly larger than the diameter of the respective vials. While the vial dispenser 14 may be constructed to have chutes of different widths, the vial dispenser of one embodiment provides more flexibility in terms of the range of vial sizes that may be accommodated by permitting the chutes to have a width that is adjustable. For example, a chute may include inserts 36 that may be selectably inserted into and removed from the chute in order to reduce or increase the width, respectably. In this regard, the insert may be an upwardly extending member that is positioned alongside and attached to a respective wall of the chute, such as by means of Velcro® or other fasteners. As shown in FIG. 3, a chute may have the largest width by not including any inserts (see, for example, the leftmost and the right center chutes of FIG. 3), a chute may have an intermediate width by having an insert extending along only one wall (see, for example, the rightmost chute of FIG. 3) or a chute may have a smaller width by having inserts extending along each of the opposed walls (see, for example, the left center chute of FIG. 3). Further, the inserts may be provided having different thicknesses such that the width of a respective chute may be configured with even greater resolution by inserting the appropriate insert(s) having a thickness selected such that the resulting width of the chute substantially matches the diameter of the vials to be stored therein.

The chutes 30 may be configured to permit their width to be adjusted in other manners including, for example, having walls 34 that are biased, such as by being spring loaded, to define a relatively narrow passageway therebetween for receiving vials 32 of various sizes. The chutes of one embodiment may include adjustment features, such as threaded screws, that permit movement of the walls to be finely tuned to match the vial diameters and to permit the guidance and positioning of the vials for dispensing. Regardless of the configuration, the chutes defined by the drawers 26 may be configured to have a width that substantially matches the size, such as the diameter, of the vials stored therein such that the vials stack one upon another, such as shown in FIG. 3.

The vial dispenser 14 also includes a gate 38 associated with each chute 30. The gate is configured to be alternately and controllably positioned in a closed position in which the vials 32 remain within the respective chute and an open position in which a vial is dispensed from the respective chute, such as by gravity feed. By controlling the position of a gate associated with a respective chute, the dispensation of a vial from a respective chute is correspondingly controlled. Since the vial dispenser of one embodiment is configured to individually dispense vials from each of the chutes of each of the drawers 26, the vial dispenser may include a plurality of gates one of which is associated with each chute of each drawer.

The vial dispenser 14 may include any of a variety of different types of gates 38. In one embodiment, the gate includes a gate member proximate a lower end of a respective chute 30 that serves to close the lower end of the respective chute when the gate member is in the closed position. The gate of this embodiment may also include a solenoid or other actuator responsive to an input command, such as from a computing device as described below, for controllably opening the gate member to discharge a vial prior to returning the gate member to the closed position. Alternatively, the gate may be manually moved between the closed and open positions.

Figure 4A:
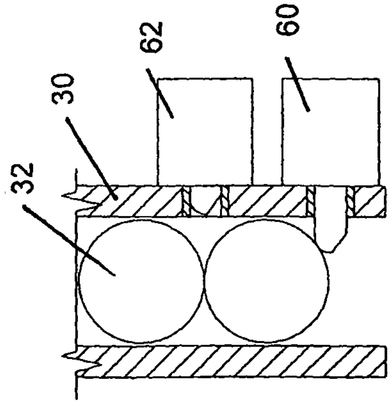
FIGS. 4A-4E illustrate a gate for discharging a single vial according to one embodiment of the present invention.
Figure 4B:
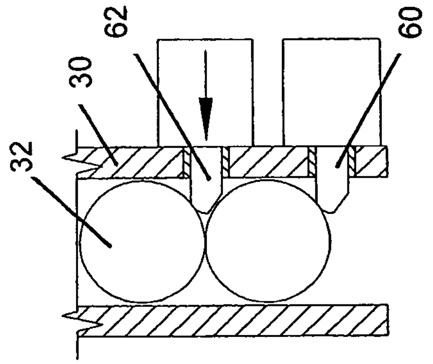
Figure 4C:
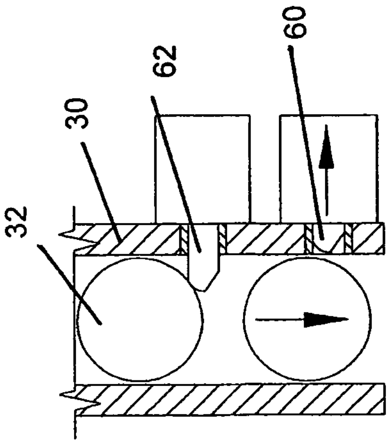
Figure 4D:
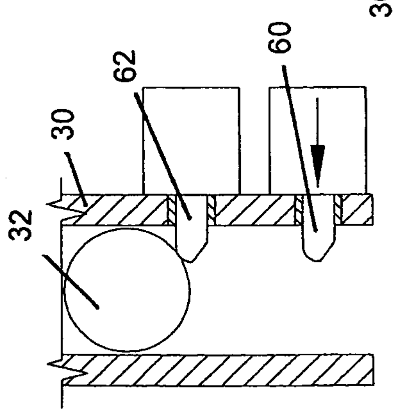
Figure 4E:
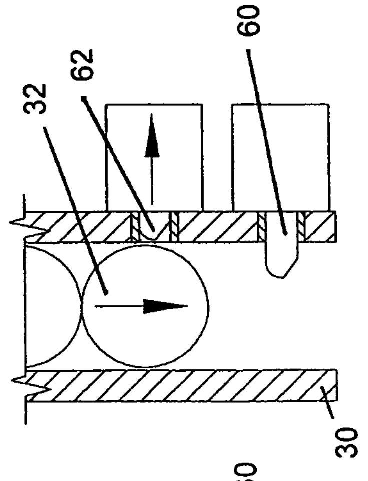

In one embodiment depicted in FIGS. 4A-4E, the gate 38 may include two actuated members, one to release a vial 32 from the chute 30 and the other to restrain the remainder of the vials within the chute while the single vial is being released. As shown in FIG. 4A, a lower member 60 may initially be extended to hold all of the vials within the chute. In order to release a vial, the upper member 62 may be extended as shown in FIG. 4B and the lower member may then be retracted as shown in FIG. 4C. Once the vial has been dispensed, the lower member can again be extended as shown in FIG. 4D and the upper member can then be retracted to permit the remaining vials to move downwardly within the chute until the vials are again supported by the lower member as indicated by FIG. 4E. Although the upper and lower members may be separately actuated, the upper and lower members may rely upon a single actuated motion, such as permitted by a linkage, that permits the upper and lower members to work in concert, albeit in opposite directions.

In another embodiment, the gate 38 may include a feed screw that extends lengthwise, such as vertically, through the chute 30. The feed screw is configured such that the pocket defined between the minor and major diameters of the helical screw is sized to receive the vials 32. In order to dispense a vial, the feed screw may be actuated, such as by means of a motor, to rotate sufficiently such that the pocket of the feed screw is in communication with and a single vial is dispensed through an opening defined by the chute.

In the embodiments described above, the chutes 30 have been generally rectangular so as to extend in a linear direction. The chutes may have other configurations, however, such as a circular configuration, in other embodiments. In this regard, the chute of yet another embodiment may be defined by a disk that defines outwardly opening pockets for storing the vials 32. The gate 38 of this embodiment may include an outer ring that extends peripherally about the disk and retains the vials within the respective pockets. The outer ring may define an opening sized to receive a vial. As such, the gate of this embodiment may move relative to the disk (either by movement of the gate, the disk or both) between a closed position in which the opening defined by the outer ring is not aligned with any pocket of the disk, and an open position in which the opening is aligned with a pocket of the disk such that a vial may be discharged from the pocket through the opening in the outer ring.

In yet another embodiment, the lowest vial 32 within an upwardly extending chute 30 could fall within a pocket defined by a shuttle that is positioned at the lower end of the chute. A user can then pull or otherwise actuate a handle to move the pocket defined by the shuttle into alignment within an opening to the access area such that the vial is discharged into the access compartment 40 by gravity feed. In this embodiment, the shuttle may include a rear portion that is moved into alignment with the stack of vials when the pocket defined by the shuttle is in alignment with the opening to the access compartment. As such, the rear portion may prevent vials within the chute from falling behind the shuttle, thereby permitting the shuttle to be returned to its original position. Once returned to its original position, the next vial would fall into the pocket defined by the shuttle and the stack of vials would be lowered by one vial diameter.

The vial dispenser 14 can also include an access compartment 40. Although the vial dispenser may be configured to have a common access compartment for each of the chutes 30 of a plurality of upwardly extending drawers 26, the vial dispenser of the illustrated embodiment includes an access compartment associated with a single upwardly extending drawer for receiving the vials dispensed from any one of the chutes of the respective drawer. As shown in FIG. 3, the access compartment generally defines a region into which the vial is dispensed. The access compartment may include one or more baffles 42 or the like for cushioning the fall of the vial into the access compartment. Further, the access compartment may be configured such that the vial comes to rest within the access compartment and remains at rest therein until a user reaches into the access compartment (such as by pushing aside a door 44 to the access compartment), grasps the vial and removes the vial therefrom. In the illustrated embodiment, for example, the floor of the access compartment defines a recess 46 in which the vial will come to rest. The access compartment may be designed such that a user is unable to access the vials within the chutes, such as by including one or more baffles with a torturous path that restricts entry of a hand or finger.

Figure 5:
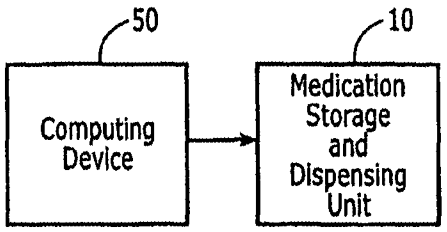
FIG. 5 is a block diagram of a computer controlled medication storage and dispensing unit according to one embodiment to the present invention.

Although the gates 38 may be opened and closed in various manners to controllably dispense the vials 32 of medication, a medication storage and dispensing unit 10 of one embodiment operates under control of a computing device 50, as shown in FIG. 5. The computing device may be embodied as various processing means including any device or circuitry embodied in hardware, software or a combination of hardware and software that is configured to perform the corresponding functions, such as a processor, a coprocessor, a controller or various other processing devices including integrated circuits such as, for example, an ASIC (application specific integrated circuit), an FPGA (field programmable gate array) or the like. In an exemplary embodiment, the processor may be configured to execute instructions stored in a memory device or otherwise accessible to the processor.

As such, the computer-controlled medication storage and dispensing unit 10 includes a computing device 50 configured to receive input from a user, such as an anesthesiologist, seeking to dispense a vial 32 of medication. In this regard, the computing device may be configured to initially authenticate the user, such as by means of a user name and password. A properly authenticated user can then indicate the particular medication, e.g., name and dosage, to be dispensed. The computing device may, in some embodiments, simply dispense a vial of the selected medication to an authorized user without further review of the requested medication. However, in other embodiments, a computing device may be configured to determine if the user, albeit authorized, should be granted access to the particular medication. The computing device may be configured to make this determination in various manners including, for example, by referencing a database or other memory device that stores a listing of medications in association with each of a plurality of authorized users of the medication storage and dispensing unit with the computing device being configured to only grant a user access to the medications listed in association with the user. Alternatively or additionally, the computing device may be configured to also receive the identification of a patient for the user and to access a prescription or other order for the respective patient to determine if the medication selected by the user corresponds to a medication to be provided to the patient. In this embodiment, the computing device may be configured to grant a user access to the selected medication in instances in which the selected medication id identified by a prescription or other order for the patient.

If the computing device 50 authorizes the user and, in some embodiments, determines that the user may appropriately access the requested medication, the computing device determines the location of the requested medication within the medication storage and dispensing unit 10. In this regard, the computing device may identify the chute 30 within the vial dispenser 14 that stores the vials of the requested medication, such as by reviewing a database stored in memory associated with or otherwise accessible by the computing device which identifies the location within the medication storage and dispensing unit of the various medications. If the requested medication is stored within the vial dispenser, the computing device may determine the chute within which the requested medication is stored and may then issue a command to the gate 38, such as to a solenoid or other actuator associated with the gate, directing the gate to move from a closed position to an open position in which a vial 32 of the medication is dispensed, such as by gravity feed, into the access compartment 40. In one alternative embodiment, following a successful authorization, the computing device may issue a command to the gate to unlock the gate. A user may then manually actuate the gate so as to discharge a vial and may then return the gate to the closed configuration. Once returned to the closed configuration, the computing device may again lock the gate.

As such, the process of dispensing the requested medication is streamlined by the medication storage and dispensing unit 10 of embodiments of the present invention in that a user no longer needs to manually open a drawer and, in turn, manually open the lid of a particular compartment within a drawer to access a medication. Instead, after being properly authorized and identifying the medication to be dispensed, the user may simply retrieve any medication housed in the vial dispenser 14 from the access compartment 40. In addition to making the medication dispensation process more streamlined, the medication storage and dispensing unit of embodiments of the present invention is also advantageous in that access is only permitted to a single vial of the medication in response to a request from a user, as opposed to conventional medication carts which may store multiple vials of medication within the same compartment to which a user is granted access in response to an authorized request. As such, the medication storage and dispensing unit may provide not only increased efficiency, but also improved control over the access to the medication stored by the vial dispenser.

As described above, the upwardly extending drawers 26 need not be opened in order to dispense a vial 32 of medication. Instead, the upwardly extending drawers need only be opened in order to conduct an inventory of the remaining vials within the vial dispenser 14 or to replenish the vials within the vial dispenser. In order to open the drawer, a user would generally again need to be authorized to be able to access the contents of a drawer, such as by entering appropriate authorization information, such as a user name and password, into the computing device 50 which, in turn, can unlock the respective upwardly extending drawer following confirmation of the user's authorization. The user may then slide the respective, upwardly extending drawer open and determine the number of remaining vials within each chute 30 of the drawer. The user may also replenish the vials within one or more of the chutes, for example, in instances in which the supply has falling below a par level or other predefined restocking threshold, prior to closing the upwardly extending drawer, which is then relocked.

In order to facilitate the inventory process, the upwardly extending drawers 26 may be constructed so as to permit a user to view the number of vials 32 within each chute 30. In this regard, the upwardly extending drawers of one embodiment may be constructed without a sidewall bridging across each of these chutes, that is, without a sidewall extending from the front to the back of the drawer. Alternatively, an upwardly extending drawer of another embodiment may include a sidewall formed of an at least partially translucent material, such as a translucent plastic material, to permit a user to view the remaining vials through the sidewall. Still further, the upwardly extending drawer of another embodiment may be configured to have a sidewall that defines a plurality of upwardly extending slots with each of the slots aligned with a respective chute. Although the slots of this embodiment would be smaller in width than the size of the vials such that the vials could not be removed through these slots, the slots would permit a user to view the vials within the respective chute.

In order to further facilitate the inventory process, the vial dispenser 14 of one embodiment may also include a quantity indicator 52. For a vial dispenser having a plurality of chutes 30, the vial dispenser may also include a plurality of quantity indicators, one of which is associated with each chute. As shown in FIG. 3 in conjunction with an embodiment in which the upwardly extending drawer 26 does not including a sidewall, the quantity indicator of a chute may be a marker or other flag that may be attached to an upwardly extending wall 34 of the respective chute. The quantity indicator may be attached at a location relative to the chute such that a predetermined number of vials 32 would be stacked between the gate 38 at the bottom of the chute and the location indicated by the quantity indicator. Since the vials that are stored within the chute will have a predefined size, such as a predefined diameter, the number of vials that will fill the chute from the gate to the relative location identified by the quantity indicator can be determined in advance. As shown in FIG. 3, the quantity indicator may indicate the predetermined number of vials, such as 5, 10, etc. Additionally, multiple quantity indicators may be associated with the same chute so as to mark different levels, such as 5 vials, 10 vials, etc.

As such, an inventory of the remaining vials 32 within a vial dispenser 14 can be conducted efficiently by reference to the quantity indicators 52. In this regard, a person conducting an inventory of the vial dispenser can simply count the number of remaining vials that are within the chute and above the quantity indicator. The person conducting inventory can then add this additional number of vials to the predefined number of vials indicated by the quantity indicator to be filling the chute between the gate 38 and the relative location of the quantity indicator. Depending upon the relative size of the vials and the expected rate at which the vials of medication will be used, a quantity indicator can be differently positioned upon each of the chutes so as to indicate different number of vials. In any event, the inventory process may be expedited by reference to the quantity indicators of this embodiment.

While one embodiment of a quantity indicator 52 is described above, the vial dispenser 14 may include other types of quantity indicators. For example, the quantity indicator may not be fixed in a relative location with respect to a chute 30, but may, instead, be positioned so as to slide upwardly and downwardly with respect to the chute so as to thereby float within the chute. In this regard, the quantity indicator would effectively float to a level indicated by the uppermost vial 32 within the chute, such as by maintaining contact with the uppermost vial within the chute and moving downwardly within the chute along with the uppermost vial as other vials are dispensed from the chute. In this embodiment, a scale could be posted alongside the chute, such as upon the upwardly extending wall 34 of the chute, so as to extend upwardly therealong. The scale could identify a number of vials within the chute up to each of a number of different locations along the height of the chute. By comparing the location of the floating quantity indicator to the scale, a person conducting an inventory of the vial dispenser could efficiently determine the number of vials remaining within the respective chute in accordance with this embodiment.

In one embodiment, the position of the floating quantity indicator could also be determined in an automated manner. For example the quantity indicator 52 may include an array of sensors or an incremental magnetic tape encoder positioned lengthwise, such as vertically in one embodiment, within the chute 30. The array of sensors or the magnetic tape encoder may be configured to detect the position of the floating quantity indicator and, in turn, to convert the position of the floating quantity indicator into the number of vials 32 within the chute, thereby providing an accurate inventory count. In the embodiment that includes an array of sensors, the sensors may be spaced along the chute at a pitch (between sensors) that permits at least one of the sensors to always detect the position of the float regardless of the location of the float within the chute. In this embodiment, once a vial is dispensed from the chute, the array of sensors can determine the relative movement of the float, thereby permitting the quantity indicator to be automatically taught the movement to be expected for the discharge of a vial of a certain size.

In any event, medication storage and dispensing unit 10 of embodiments of the present invention facilitate the inventory process which may occur relatively frequently, such as at the conclusion of each day.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A medication storage and dispensing unit comprising
- a support platform; and
- a vial dispenser supported by the support platform, wherein the vial dispenser comprises:
- a chute configured to store a plurality of vials of medication, wherein the chute comprises a pair of opposed walls, each wall having an inner surface facing the other wall of the pair and an outer surface facing away from the other wall of the pair, wherein the chute defines an outer width between outer surfaces of the pair of opposed walls and an inner width between inner surfaces of the pair of opposed walls, and wherein a position of at least one of the walls is adjustable such that the outer width of the chute remains unchanged but the inner width of the chute is correspondingly adjustable to configure the chute to maintain a configurable uniform width and to store differently sized vials;
- a quantity indicator associated with the chute to indicate a quantity of vials;
- a gate configured to be alternately and controllably positioned in a closed position in which vials remain within the chute and an open position in which a vial is dispensed from the chute,
- wherein the vial dispenser is configured such that a vial is discharged from the chute when the gate is in the open position; and
- a plurality of upwardly extending, individually accessible drawers, wherein each drawer is lockable and unlockable individually.

2. A medication storage and dispensing unit according to claim 1 wherein the vial dispenser comprises a plurality of upwardly extending chutes, each chute configured to store a plurality of vials of a respective medication.

3. A medication storage and dispensing unit according to claim 1 wherein the vials of a medication have a predefined diameter, and wherein the chute is sized to store the plurality of vials of medication stacked diameter upon diameter.

4. A medication storage and dispensing unit according to claim 1 further comprising a selectably insertable insert disposed within the chute to define the at least one adjustable wall of the chute.

5. A medication storage and dispensing unit according to claim 1 wherein the vial dispenser further comprises the quantity indicator associated with the chute and dependent upon a size of the vials so as to indicate the quantity of vials within the chute.

6. A medication storage and dispensing unit according to claim 1 wherein each drawer includes an upwardly extending chute configured to store a plurality of vials of medication stacked one upon another.

7. A medication storage and dispensing unit according to claim 1 wherein the support platform comprises a medication storage cabinet comprising at least one drawer for storing medications, and wherein the vial dispenser extends upwardly from the medication storage cabinet.

8. A medication storage and dispensing unit according to claim 1 wherein the at least one wall of the chute comprises a spring-loaded wall.

9. A mediation storage and dispensing unit according to claim 1 wherein the at least one wall of the chute comprises a threadably adjustable wall.

10. A computer controlled medication storage and dispensing unit comprising:
- a support platform;
- a vial dispenser supported by the support platform, wherein the vial dispenser comprises:
  - a chute configured to store a plurality of vials of medication, wherein the chute comprises a pair of opposed walls, each wall having an inner surface facing the other wall of the pair and an outer surface facing away from the other wall of the pair, wherein the chute defines an outer width between outer surfaces of the pair of opposed walls and an inner width between inner surfaces of the pair of opposed walls, and wherein a position of at least one of the walls is adjustable such that the outer width of the chute remains unchanged but the inner width of the chute is correspondingly adjustable to configure the chute to maintain a configurable uniform width and to store differently sized vials;
  - a quantity indicator associated with the chute to indicate a quantity of vials;
  - a gate configured to be alternately positioned in a closed position in which vials remain within the chute and an open position in which a vial is dispensed from the chute;

a plurality of upwardly extending, individually accessible drawers, wherein each drawer is lockable and unlockable individually; and a computing device configured to receive user input regarding dispensation of a vial and further configured to actuate the gate to thereby permit the gate to move to the open position such that the vial is dispensed from the chute.

11. A computer controlled medication storage and dispensing unit according to claim 10 wherein the vial dispenser comprises a plurality of upwardly extending chutes, each chute configured to store a plurality of vials of a respective medication.

12. A computer controlled medication storage and dispensing unit according to claim 10 wherein the vials of a medication have a predefined diameter, and wherein the chute is sized to store the plurality of vials of medication stacked diameter upon diameter.

13. A computer controlled medication storage and dispensing unit according to claim 10 further comprising a selectably insertable insert disposed within the chute to define the at least one adjustable wall of the chute.

14. A computer controlled medication storage and dispensing unit according to claim 10 wherein the vial dispenser further comprises the quantity indicator associated with the chute and dependent upon a size of the vials so as to indicate the quantity of vials within the chute.

15. A computer controlled medication storage and dispensing unit according to claim 10 wherein each drawer includes an upwardly extending chute configured to store a plurality of vials of medication stacked one upon another.

16. A computer controlled medication storage and dispensing unit according to claim 15 wherein the support platform comprises a medication storage cabinet comprising at least one drawer for storing medications, wherein the vial dispenser extends upwardly from the medication storage cabinet.

17. A computer controlled medication storage and dispensing unit according to claim 10 wherein the at least one wall of the chute comprises a spring-loaded wall.

18. A computer controlled medication storage and dispensing unit according to claim 10 wherein the at least one wall of the chute comprises a threadably adjustable wall.

19. A vial dispenser comprising:

a housing; and a plurality of upwardly extending, individually accessible drawers disposed within the housing, wherein each drawer is configured to be locked and unlocked individually and for movement inward and outward in a first direction relative to the housing, and wherein each drawer comprises:

a chute configured to store a plurality of vials of medication stacked one upon another, wherein the chute extends upwardly in a second direction different than the first direction, wherein the chute comprises a pair of opposed walls, each wall having an inner surface facing the other wall of the pair and an outer surface facing away from the other wall of the pair, wherein the chute defines an outer width between outer surfaces of the pair of opposed walls and an inner width between inner surfaces of the pair of opposed walls, and wherein a position of at least one of the walls is adjustable such that the outer width of the chute remains unchanged but the inner width of the chute is correspondingly adjustable to configure the chute to maintain a configurable uniform width and to store differently sized vials;

a quantity indicator associated with the chute to indicate a quantity of vials; and a gate configured to be alternately and controllably positioned in a closed position in which vials remain within the chute and an open position in which a vial is dispensed from the chute.

20. A vial dispenser according to claim 19 wherein at least one drawer comprises a plurality of upwardly extending chutes, each chute configured to store a plurality of vials of a respective medication.

21. A vial dispenser according to claim 19 wherein the vials of a medication have a predefined diameter, and wherein the upwardly extending chute is sized to store the plurality of vials of medication stacked diameter upon diameter.

22. A vial dispenser according to claim 19 further comprising a selectably insertable insert disposed within the chute to define the at least one adjustable wall of the chute.

23. A vial dispenser according to claim 19 wherein at least one drawer further comprises the quantity indicator associated with the chute and dependent upon a size of the vials so as to indicate the quantity of vials within the chute.

24. A vial dispenser according to claim 19 wherein the at least one wall of the chute comprises a spring-loaded wall.

25. A vial dispenser according to claim 19 wherein the at least one wall of the chute comprises a threadably adjustable wall.

* * * * *